US011847697B1

(12) United States Patent
Green

(10) Patent No.: US 11,847,697 B1
(45) Date of Patent: Dec. 19, 2023

(54) COMPRESSION OPTIMIZATION

(71) Applicant: Cboe Exchange, Inc., Chicago, IL (US)

(72) Inventor: Joseph Green, Glenview, IL (US)

(73) Assignee: Cboe Exchange, Inc., Chicago, IL (US)

(*) Notice: Subject to any disclaimer, the term of this patent is extended or adjusted under 35 U.S.C. 154(b) by 31 days.

(21) Appl. No.: 17/201,702

(22) Filed: Mar. 15, 2021

Related U.S. Application Data

(60) Provisional application No. 62/989,308, filed on Mar. 13, 2020.

(51) Int. Cl.
*G06Q 40/04* (2012.01)
*H03M 7/30* (2006.01)

(52) U.S. Cl.
CPC .......... *G06Q 40/04* (2013.01); *H03M 7/6011* (2013.01)

(58) Field of Classification Search
None
See application file for complete search history.

(56) References Cited

U.S. PATENT DOCUMENTS

| | | | |
|---|---|---|---|
| 7,660,762 B1* | 2/2010 | Mellina ................. | G06Q 40/04 705/37 |
| 11,231,884 B1 | 1/2022 | Thornberg | |
| 2002/0099641 A1* | 7/2002 | Mills ..................... | G06Q 40/04 705/37 |
| 2002/0178102 A1* | 11/2002 | Scheinberg ............ | G06Q 40/04 705/37 |
| 2004/0148249 A1* | 7/2004 | Kinnear ................. | G06Q 40/00 705/37 |
| 2014/0156492 A1* | 6/2014 | Crowley ................ | G06Q 40/04 705/37 |
| 2017/0323385 A1* | 11/2017 | Sivaramakrishnan ...... | G06Q 40/06 |
| 2020/0081996 A1 | 3/2020 | Chuprun et al. | |
| 2021/0192504 A1 | 6/2021 | Palm et al. | |

OTHER PUBLICATIONS

BGC brokers' capitalab extends its portfolio compression service to FX derivatives and interest rate caps and floors; reaches $3.5 trillion in interest rate swaptions. (Nov. 22, 2016). PR Newswire Retrieved from https://dialog.proquest.com/professional/docview/1841946222?accountid=131444 on Apr. 27, 2023 (Year: 2016).*

(Continued)

*Primary Examiner* — Kito R Robinson
(74) *Attorney, Agent, or Firm* — Fish & Richardson P.C.

(57) ABSTRACT

A method is provided for compressing data in an exchange computer system. The method includes receiving position data indicative of a position held with respect to a financial instrument by an exchange participant from among a plurality of exchange participants, and receiving constraint data indicative of one or more constraints on compression defined by the exchange participant. The exchange computer system compresses data based on the position data and the constraint data, resulting in, for each of the plurality of exchange participants, a new allocation of position sizes relative to positions held prior to compression. The new allocation of position sizes is such that a set of long positions held by the plurality of exchange participants with respect to the financial instrument are cancelled out by a set of short positions held by the plurality of exchange participants with respect to the financial instrument.

20 Claims, 3 Drawing Sheets

(56) References Cited

OTHER PUBLICATIONS

[No Author], "Compression Optimization Prototype Feb. 2020 Documentation," Feb. 2020, 16 pages.
IBM [online], "IBM ILOG CPLEX Optimization Studio," Mar. 15, 2021, retrieved on Jul. 13, 2022, retrieved from URL <https://www.ibm.com/products/ilog-cplex-optimization-studio>, 8 pages.
Proquest [online], "CCIL launches portfolio compression services," McClatchy—Tribune Business News, Jul. 29, 2011, retrieved on Nov. 4, 2022, retrieved from URL <https://dialog.proquest.com/professional/docview/879681774?accountid=131444>, 5 pages.
Proquest [online], "Credit valuation adjustment compression by genetic optimization," Risks, 7(4):100, 2019, retrieved on Nov. 4, 2022, retrieved from URL <doi:http://dx.doi.org/10.3390/risks7040100>, 31 pages.
Proquest [online], "United States: CME group's first multi-lateral equity options compression cycle successfully reduces nearly 590,000 contract sides," MENA Report, Nov. 8, 2018, retrieved on Nov. 4, 2022, retrieved from URL <https://dialog.proquest.com/professional/docview/2130149250?accountid=131444>, 5 pages.

* cited by examiner

COMPRESSION OPTIMIZATION

CROSS-REFERENCE TO RELATED APPLICATION

This application claims the benefit of U.S. Provisional Patent Application No. 62/989,308, filed Mar. 13, 2020, which is incorporated herein by reference in its entirety.

TECHNICAL FIELD

This application relates to technology for trading financial instruments in electronic exchanges, as well as hybrid exchanges that combine electronic and open-outcry trading mechanisms.

BACKGROUND

High volumes of financial instruments such as derivatives, stocks, and bonds are continuously traded at electronic exchanges, which enable trades to occur in real time through the algorithmic processing of orders and associated market information.

Generally, a trade may be executed when the price associated with a bid to purchase a financial instrument matches the price associated with an offer to sell the same instrument. Market participants typically price their bids and offers based on market conditions, which are subject to rapid change, and electronic exchanges often match bids and offers based on priority rules including price-time priority, and the principle of first-in, first-out (FIFO).

Within trading environments such as these, some market participants leverage sophisticated computer algorithms that can analyze market conditions and react to changes by placing large volumes of orders at relatively high speeds—typically, within fractions of a second of a detected change. The increased prevalence of algorithmic trading and the increased order flow associated with such practices has strained the computational resources of many electronic exchanges.

SUMMARY

The disclosure that follows relates to technology enabling an exchange computer system to better manage the high volume of orders that need to be processed through a method of trade compression that increases the system's overall speed and efficiency. Trade compression offers the additional benefit of reduced risk for market participants who opt in to the exchange's compression system.

In more detail, trade compression refers to a process through which participating traders (sometimes also referred to as "market participants" or "exchange participants") can reduce the number of orders (and gross notional amounts) but keep the same economic exposure. In some instances, trade compression can be performed on a bilateral basis, where market participants cancels offsetting orders in a portfolio, or on a multilateral basis, where a group of market participants can perform offsetting trades with each other within agreed parameters. Compression can be performed for all or part of the notional amounts concerned. From a market participant's perspective, trade compression can offer an important means of reducing gross notional amounts, achieving regulatory capital savings, and reducing operational and counterparty risk exposures.

The exchange computer system includes a compression service that uses position data and constraint data to generate compressed data. The compression service can enable complex, valuable, and differentiated trade compression services for market participants based on, for example, financial instrument, geography, base currency, and trading expertise, among other factors.

In principal, the compression service generates compressed data based on position data and constraint data. The position data indicates positions held with respect to financial instruments by exchange participants. The constraint data indicates one or more constraints on compression defined by the exchange participant, e.g., maximum cost, or maximum/minimum aggregate delta of compression trades. The position data and the constraint data are expressed in the same fungible base currency, and thus, the compression techniques disclosed herein can be applied to heterogenous cross-asset portfolios where feasible.

In some implementations, the compression service disclosed herein enables multi-lateral basket execution-based compression. In this context, "manual execution" refers to counterparty position information that is communicated to market participants responsible for contacting contra participants, negotiating and consummating trades manually on a strike-by-strike basis. "Basket execution" refers to a service that produces batches of trades, which once approved by the market participants, are crossed by the system at official exchange published settlement prices strike basis.

In one aspect, a method for compressing data in an exchange computer system includes receiving position data indicative of a position held with respect to a financial instrument by an exchange participant from among a plurality of exchange participants. The method can also include receiving constraint data indicative of one or more constraints on compression defined by the exchange participant and compressing data in the exchange computer system based on the position data and the constraint data. The compression of data in the exchange computer system based on the position data and the constraint data results in, for each of the plurality of exchange participants, a new allocation of position sizes relative to positions held prior to compression. The new allocation of position sizes may also be such that a set of long positions held by the plurality of exchange participants with respect to the financial instrument are cancelled out by a set of short positions held by the plurality of exchange participants with respect to the same financial instrument.

One or more implementations can include the following optional features. In some implementations, compressing data in the exchange computer system based on the position data and the constraint data includes additional steps. These steps include determining one or more trades for the plurality of exchange participants based on the position data and the constraint data and transmitting trade data indicative of the one or more trades to the plurality of exchange participants, along with a request for approval by each of the plurality of exchange participants. The exchange computer system may receive a response from each of the plurality of exchange participants indicating approval, and may then execute the one or more trades.

In some implementations, the additional steps include determining a first set of one or more trades for the plurality of exchange participants based on the position data and the constraint data, and transmitting trade data indicative of the first set of one or more trades to the plurality of exchange participants, along with a first request for approval. The exchange computer system may receive a first set of responses from the plurality of exchange participants, with at least one response indicating rejection of at least one trade included in the first set of one or more trades. Before or after receiving the rejection, the exchange computer may determine a second set of one or more trades for the plurality of exchange participants based on the position data and the constraint data. The exchange computer system may then transmit trade data indicative of the second set of one or more trades to the plurality of exchange participants, along with a second request for approval. The exchange computer system may receive a second set of responses from the plurality of exchange participants indicating approval of the second set of one or more trades, and may then execute the second set of one or more trades.

In some implementations, the exchange computer system is a distributed computer system comprising an order routing system, an order matching system, and a compression engine. The compression engine may be implemented as a component of the order matching system, or may instead be implemented separate from the order matching system.

In some implementations, the position data indicates a quantity of the financial instrument held by the exchange participant. The position data may, for example, be derived from an input portfolio for the exchange participant.

In some implementations, the constraint data indicates minimum and maximum bounds on metrics in a potential compressed portfolio for the exchange participant, relative to values of the metrics in an input portfolio for the exchange participant. The constraint data may also indicate a contribution of each of a plurality of financial instruments held by the exchange participant to each of the metrics in the potential compressed portfolio.

In some implementations, compressing data in the exchange computer system based on the position data and the constraint data includes optimizing a function, wherein the function comprises, for each of the plurality of exchange participants, a sum of current credit exposures and potential future credit exposures. The sum of current credit exposures and potential future credit exposures may be expressed according to a base currency, and the function may be minimized based on the constraint data. A position held by an exchange participant with respect to a financial instrument may, for example, be expressed according to a base currency, and one or more constraints on compression defined by the exchange participant may be expressed according to the same base currency.

Certain implementations may provide various advantages. For example, the disclosed technology can be used to enhance the speed and efficiency with which an exchange computer system processes high volumes of orders. The disclosed technology can also be used to reduce risk exposures for the traders who opt in to the exchange's compression system.

The details of one or more embodiments of the subject matter described in this specification are set forth in the accompanying drawings and the description below. Other potential aspects, features, and advantages will be apparent from the description, the drawings, and the claims.

DETAILED DESCRIPTION

Figure 1:
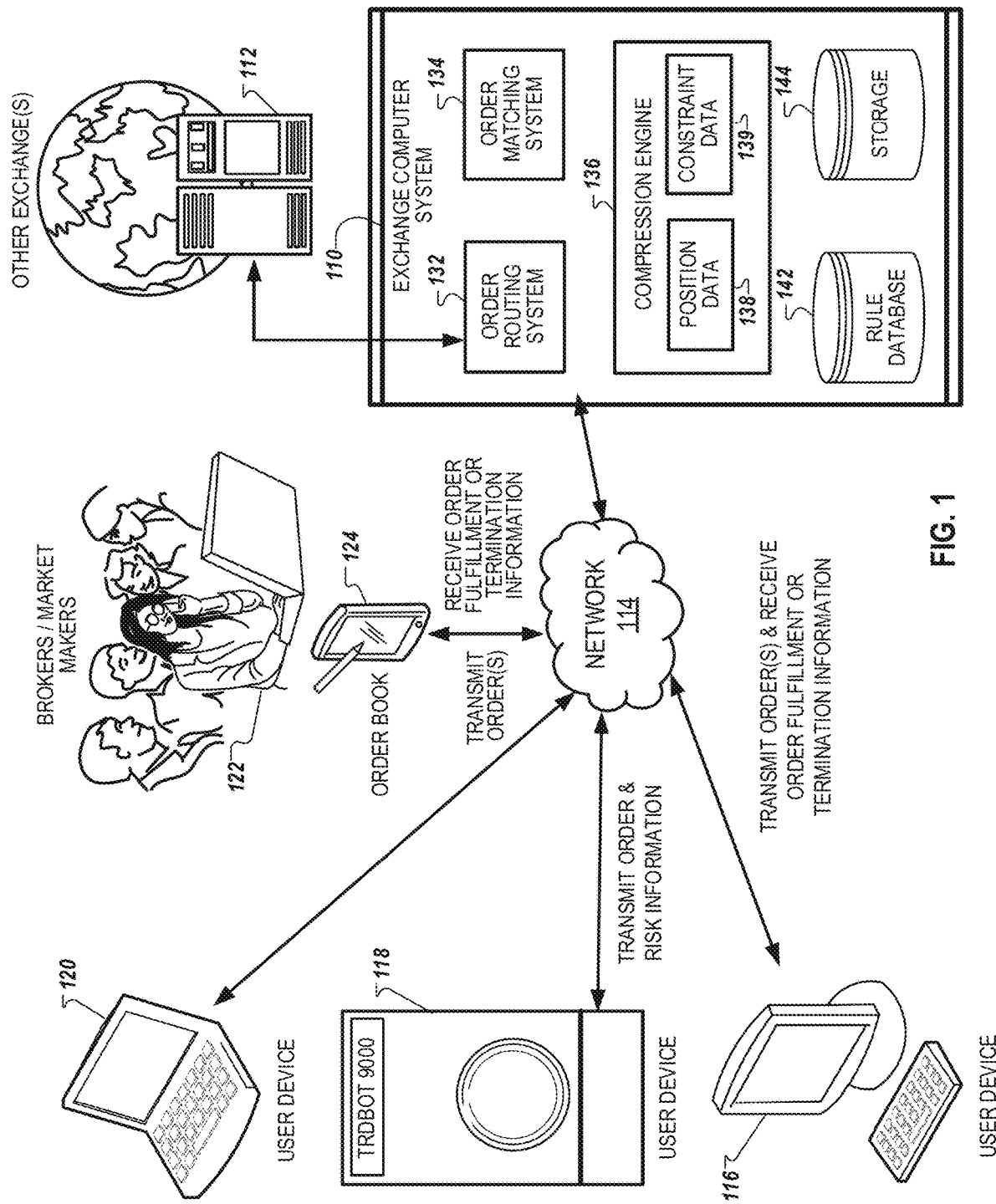
FIG. 1 is a diagram of an example of an exchange computer system and associated networks, devices, and users.

FIG. 1 is a diagram of an exchange computer system and the associated networks, devices, and users that make up an exemplary trading environment in which that system operates. Generally, the term "user" may refer to any entity that interacts with the exchange computer system and/or associated networks and devices. Users may include, for example, market makers and other market professionals, brokers, institutional traders, individual traders, and automated trading systems. The diagram includes an exchange computer system 110, other exchanges 112, a network 114, user devices 116, 118, 120, market makers/brokers 122, and electronic order book 124.

The exchange computer system 110 may be implemented in a fully electronic manner, or in a hybrid manner that combines electronic trading with aspects of traditional open-outcry systems. The exchange computer system 110 may receive orders for trading financial instruments locally on the floor and from remote electronic devices. The financial instruments may include securities such as stocks, options, futures, or other derivatives associated with an underlying asset.

Network 114 connects the various components within the trading environment, and is configured to facilitate communications between those components. Network 114 may, for example, be configured to enable the exchange of electronic communications that include order and order fulfillment information between connected devices, such as an electronic order book 124 and the exchange computer system 110.

Network 114 may include one or more networks or subnetworks, each of which may include a wired or wireless data pathway. Network 114 may, for example, include one or more of the Internet, Wide Area Networks (WANs), Local Area Networks (LANs), or other packet-switched or circuit-switched data networks that are capable of carrying electronic communications (e.g., data or voice communications).

To protect communications between the various systems, devices, and components connected to network 114, network 114 may implement security protocols and measures such that data identifying order or bid information, or parties placing orders or quotes, may be securely transmitted. Network 114 may, for example, include virtual private networks (VPNs) or other networks that enable secure connections to be established with exchange computer system 110.

User devices 116, 118, and 120 may include portable or stationary electronic devices, such as smartphones, laptops, desktops, and servers that include user interfaces to display information and receive user input, and that are configured to communicate over a computer network. User devices 116, 118, and 120 may communicate with the exchange computer system 110 over network 114 using a proprietary protocol, or a message-based protocol such as financial information exchange (FIX), implemented over TCP/IP.

User devices 116, 118, and 120 may transmit user input such as order information or risk information to the exchange computer system 110, and may also receive data from the exchange computer system 110 indicating that an order has been filled or canceled.

Users such as brokers/market makers 122 may also place orders and receive information about order fulfillment or termination through electronic order book 124, which may include a record of outstanding public customer limit orders that can be matched against future incoming orders.

The exchange computer system 110 includes an order routing system (ORS) 132, an order matching system (OMS) 134, a compression engine 136, a database of trading rules and algorithms 142, and storage 144. In some implementations, the exchange computer system 110 is a distributed computer system.

The order routing system (ORS) 132 determines whether a received order or quote is to be executed at the exchange computer system 110, or should instead be redirected to another exchange 112, and includes processing systems that enable the management of high data volumes. The ORS 132 may, for example, receive order or quote information for the purchase or sale of financial instruments from one or more user devices 116, 118, 120, and 124. In some implementations, the ORS 132 may also be connected to or include a touch-screen order routing and execution system accessible by brokers on the exchange floor, such as a public automated routing (PAR) system.

Upon receiving an order or quote, the ORS 132 determines if the destination specified in the received order or quote is the exchange computer system 110. If the exchange computer system 110 is not the destination, the ORS 132 forwards the order or quote to another exchange 112, which may be either the destination exchange, or an exchange en route to the destination exchange.

If the ORS 132 determines that the exchange computer system 110 is the destination of the received order or quote, the ORS 132 may forward the received order or quote to the order matching system 134.

The order matching system (OMS) 134 includes processing systems that analyze and manipulate orders according to matching rules stored in the database 142. The OMS 134 may also include an electronic book (EBOOK) of orders and quotes with which incoming orders to buy or sell are matched, according to the matching rules. The EBOOK may also be implemented in a separate database such as storage 144, which may include multiple mass storage memory devices for the storage of order and quote information. When the OMS 134 determines that a match exists for an order (for example, when a bid matches an offer for sale), the order matching system 134 may mark the matched order or quote with a broker-specific identifier so that the broker sending the order or quote information can be identified.

The compression engine 136, which may be implemented either as part of the order matching system 134 or as a separate component of exchange computer system 110, performs trade compression based on position data 138 and constraint data 139. By so doing, the compression engine 136 enhances exchange computer system 110's order processing efficiency, and reduces risk for exchange participants 122. For example, the compression engine 136 uses the position data 138 and the constraint data 139 to determine a new allocation of position sizes relative to positions held prior to compression (e.g., positions identified in position data 138) such that a set of long positions held by the exchange participants 122 with respect to a financial instrument are cancelled out by a set of short positions held by the plurality of exchange participants with respect to the financial instrument.

Position data 138 identifies current positions of market participants (e.g., shares of stock, number of options contracts, etc.). Constraint data 139 defines one or more constraints on values of various metrics associated with a compressed portfolio. The metrics can be user-defined in that their values are defined by individual market participants (or, in some instances, collectively defined by a group of market participants). The constraints can be expressed as minimum and maximum bounds on a given metric value (relative to values in an input portfolio specified by position data 138).

In generating the compressed data, the compression engine 136 applies one or more constraints specified in the constraint data 139 to ensure that the new allocation of position sizes are acceptable to the exchange participants 122. The one or more constraints enforce the bounds on the changes made to metrics within a reallocated portfolio within the compressed data relative to values of the metrics in a corresponding portfolio prior to compression.

Storage 144 and database 142 store and handle data in a manner that satisfies the privacy and security requirements of the exchange computer system 110 and its users, and may store one or more of telemetric data, user profiles, user history, and rules and algorithms for matching quotes, bids, and orders.

Upon completion of a trade (through the floor in open outcry as entered into the PAR system, or through automatic execution through the OMS 134 and compression engine 136), the fill information is passed through the OMS 134 and the ORS 132 to one or more user devices 116, 118, 120, and 124. The OMS 134 matches the buy side and sell side of a trade, and forwards the matched trade to a third party organization that verifies the proper clearance of the trade, such as the Options Clearing Corporation (OCC) where the securities may be options, or Depository Trust Company (DTC) where the securities may be equities. The OMS 134 also formats the quote and sale update information and sends that information through an internal distribution system that refreshes display screens on the floor, in addition to submitting the information to a quote and trade dissemination service such as, in the case of options, the Options Price Reporting Authority (OPRA). In the case of Equities, the information would be submitted to the Securities Information Processor (SIP).

The compression engine 136 can be configured to perform trade compression in various ways that reduce complexity and user burden while also minimizing risk to exchange participants. For example, the compression engine 136 can perform trade compression that is limited to closing only transactions. As another example, the compression engine 136 can perform trade compression that allows opening new positions requested by market participants, subject to legal and regulatory approval. The compression engine 136 can be configured to perform trade compression on a bilateral and multi-lateral basis, as discussed in more detail below.

Figure 2:
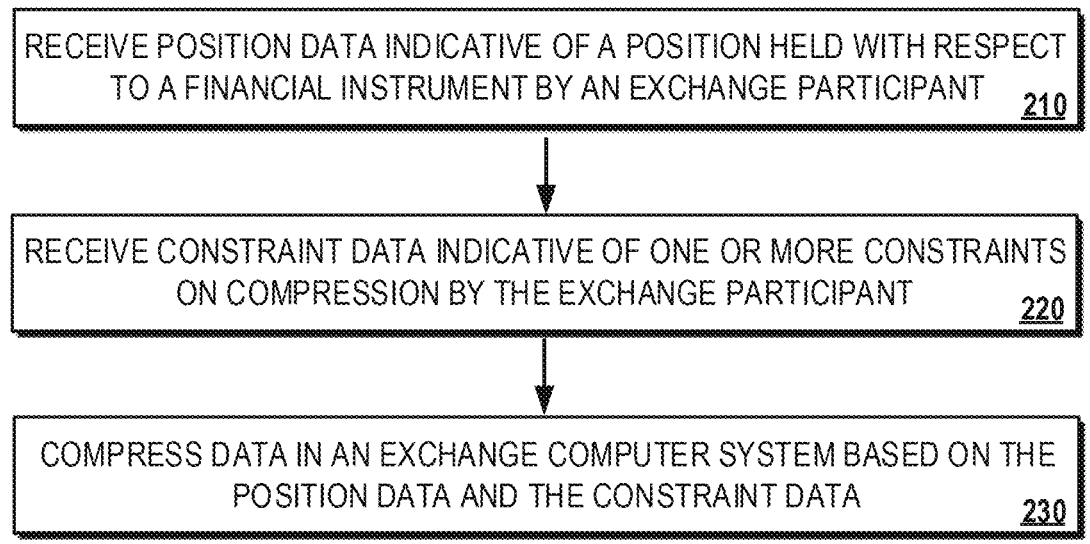
FIG. 2 is a flowchart of an example process for implementing trade compression based on position data and constraint data.

FIG. 2 is a flowchart of an exemplary process 200 for implementing trade compression based on position data and constraint data. Briefly, the process 200 includes the steps of receiving position data indicative of a position held with respect to a financial instruction by an exchange participant (210), receiving constraint data indicative of one or more constraints on compression by the exchange participant (220), and compressing data in an exchange computer system based on the position data and the constraint data (230).

In more detail, the process 200 includes the step of receiving position data indicative of a position held with respect to a financial instruction by an exchange participant (210). For example, the exchange computer system 110 may receive and store position data 138 indicating a position held with respect to a financial instrument by an exchange participant from among the plurality of exchange participants 122. In some implementations, the position held with respect to the financial instrument by the exchange participant is expressed according to a base currency.

The process 200 includes the step of receiving constraint data indicative of one or more constraints on compression by the exchange participant (220). For example, the exchange computer system 110 may receive and store constraint data 139 indicating one or more constraints on compression defined by the exchange participant. As discussed above, the constraint data can indicate, for example, minimum and maximum bounds on metrics in a potential compressed portfolio for the exchange participant relative to values of the metrics in an input portfolio for an exchange participant. In other examples, the constraint data indicates a contribution of each of a plurality of financial instruments held by the exchange participant to each of the metrics in the potential compressed portfolio. In some implementations, one or more constraints on compression are defined by the exchange participant and are expressed according to the base currency.

The process 200 includes the step of compressing data in an exchange computer system based on the position data and the constraint data (230). For example, the exchange computer system 110's compression engine 136 may compress data based on the position data 138 and the constraint data 139. The compression engine 136 can compress data such that it results in a new allocation of position sizes relative to positions held prior to compression. The new allocation of position sizes is optimized such that a set of long positions held by the exchange participants 122 with respect to the financial instrument are cancelled out by a set of short positions held by the exchange participants 122 with respect to the same financial instrument.

In some implementations, the compression engine 136 may compress data in the exchange computer system by determining one or more trades for exchange participants. In such implementations, the compression engine 136 may transmit trade data indicative of the one or more trades to the exchange participants. The compression engine 136 can also transmit a request for approval to each of the plurality of exchange participants. Once the compression engine 136 receives a response from each of the plurality of exchange participants indicating approval, the compression engine 136 executes the one or more trades.

In some implementations, in compressing data, the compression engine 136 initially determines a first set of one or more trades for the exchange participants based on the position data and the constraint data. In such implementations, the compression engine 136 transmits trade data indicative of the first set of one or more trades to the exchange participants. The compression engine 136 also transmits a first request for approval to each of the plurality of exchange participants and receives a first set of responses from the plurality of exchange participants. At least one response included in the first set of responses may indicate rejection of at least one trade included in the first set of one or more trades. Either before or after the rejection is received, the compression engine 136 can determine a second set of one or more trades for the exchange participants. The compression engine 136 can then transmit trade data indicative of the second set of one or more trades to the exchange participants. The compression engine 136 also transmits a second request for approval to each of the plurality of exchange participants. In response to receiving a second set of responses from the exchange participants indicating approval of the second set of one or more trades, the compression engine 136 executes the second set of one or more trades.

In some implementations, the compression engine 136 compresses data by optimizing a function. In such implementations, the function includes a sum of current credit exposures and potential future credit exposures for each of the plurality of exchange participants. For example, the sum of current credit exposures and potential future credit exposures can be expressed according to a base currency and the function may be minimized such that the constraints expressed by each participating trader are satisfied, and such that the resulting long and short positions for each financial instrument involved in the compression are canceled out between the participating traders.

Figure 3:
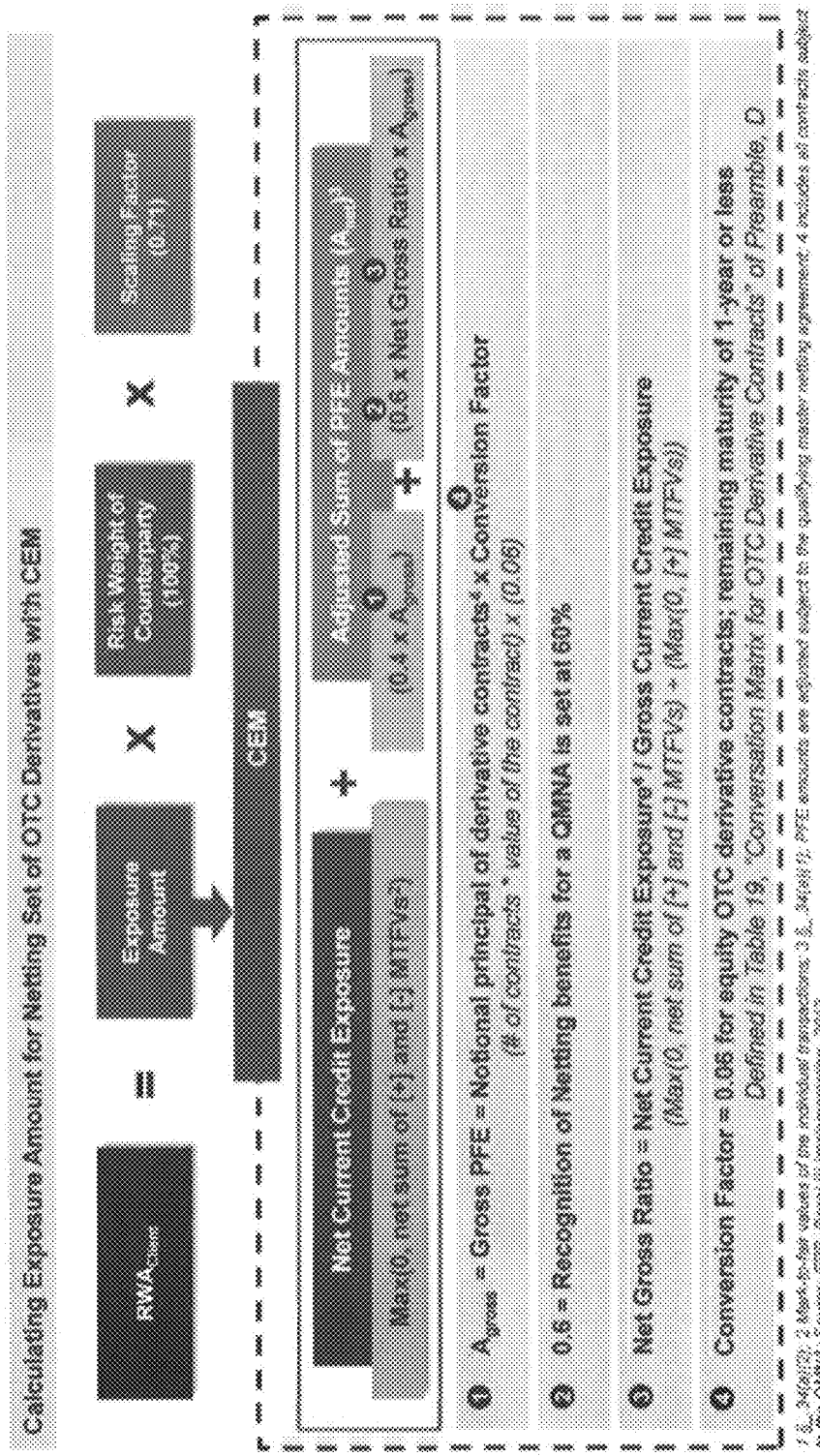
FIG. 3 is a diagram of an objective function that may be solved to optimize trade compression.

FIG. 3 is a diagram of an objective function that may be solved as part of an example technique for optimizing trade compression, as described above. In this example, the compression engine 136 takes the following inputs:
  for each participating trader, a file containing current positions, financial instrument feature contributions and feature constraints;
  the date on which compression is being carried out;
  an underlier price on the date on which compression is being carried out;
  a file containing a "Conversion Value" table used in objective function calculations; and
  a settings file, defining certain parameter values used in objective function calculations.

In this example, the current positions for a particular participating trader may be expressed in terms of size (a position quantity for a financial instrument, which may be negative if short), value (a "fair value" of the instrument), root (an instrument root symbol), expiration (if the instrument is an option, expressing an expiration date), type (if the instrument is an option, indicating whether the option is a put or a call), and strike.

In this example, the compression engine 136 uses the following parameters included in the settings file to perform objective function calculations:
  a risk weight of counterparty that is provided in the settings file and that may normally have a value of 1.0 (i.e., 100%);
  a scaling factor that is used when calculating the objective contribution of a participating trader and that may normally have a value of 0.71;

In the example shown in FIG. 3, each trader participating in the compression contributes to the objective function via an Exposure Amount that may be calculated according to the following:
  net current credit exposure–a maximum of 0 and sum, for each option position, of size×value, where size and value are provided in input data; and
  $A_{gross}$–a sum, for each short option position, of size× underlier_value×multiplier×option_conversion_factor, where size and underlier_value are provided in input data, multiplier may be specified in input data or may otherwise default to 100, and option_conversion_factor may be derived from Conversion Factor input according to option time-to-maturity (e.g., in calendar days)

In the example shown in FIG. 3, a recognition_factor is provided by the settings file (e.g., compression data 139) and has a value of 0.6, and $A_{gross}$ is multiplied by (1−recognition_factor) in the first term of the adjusted sum of potential future credit exposure (PFE) Amounts. The Net Gross Ratio term is not used in this example and is set to a value of 0.

The compression engine 136 solves the objective function based on one or more of the above inputs and parameters, and in doing so may calculate exposure amount for multiple financial instruments (e.g., derivative contracts), subject to a Qualifying Master Netting Agreement (QMNA). The sum of net current credit exposure may then be added to the adjusted sum of PFE.

The compression engine 136 may solve the objective function by running a command that will execute optimization for a problem input file, and may write reports to an output file that is then then referenced by OMS 134 or another part of the exchange computer system 110. Compression engine 136 may, for example, produce the following outputs upon solving the objective function:

- for each participating trader, initial positions at financial instrument level;
- for each participating trader, optimized positions at financial instrument level;
- summaries of the initial and optimized trader positions with respect to constraints and optimization objective;
- changes in constrained values and objective function components;
- changes in financial instrument position sizes;
- transactions between participating traders; and
- an overall reduction achieved in the objective value.

Implementations have been described, but other implementations are within the scope of the following claims.

What is claimed is:

1. A method for compressing data in an exchange computer system comprising:
    receiving, via one or more user devices, position data indicative of a position held with respect to a financial instrument by an exchange participant from among a plurality of exchange participants, the position data, including a first allocation of position sizes and being received through the exchange computer system that comprises a compression engine and storage;
    receiving constraint data that includes (1) data indicative of one or more constraints on compression associated with each exchange participant, the constraint data including minimum and maximum bounds of a metric relative to values specified by the position data, or (2) data indicative of a contribution of each of a plurality of financial instruments held by the exchange participant to each of the metrics; and
    storing the constraint data and the position data in storage;
        compressing, by the compression engine, data in the exchange computer system utilizing the position data and the constraint data for each exchange participant, wherein compressing comprises:
        applying, by the compression engine, one or more constraints specified in the constraint data to determine a new allocation of position sizes that are acceptable to the plurality of exchange participants;
        determining a first set of one or more candidate trades for exchange participants, the first set of one or more candidate trades utilizing the position data and the constraint data, and wherein the first set of one or more candidate trades includes data indicative of a buy side and a sell side;
        transmitting a request for approval of the first set of the one or more candidate trades to the one or more user devices of the plurality of exchange participants; and
        receiving a response from each of the one or more user devices of the plurality of exchange participants indicating approval or rejection of the first set of the one or more candidate trades; and
        generating, in response to compressing the data by the compression engine, and for each of the plurality of exchange participants, a second allocation of position sizes relative to the first allocation of positions sizes held before compression of the position data and constraint data;
        cancelling, by the compression engine, in response to generating the second allocation of position sizes, a set of long positions held by each of the plurality of exchange participants with respect to the financial instrument by a set of short positions held by each of the plurality of exchange participants with respect to the financial instrument; and
        upon completion of the first set of one or more candidate trades, transmitting the data indicative of the buy side and the sell side of the first set of one or more candidate trades to a third party external to the exchange computer system.

2. The method for compressing data in an exchange computer system of claim 1, wherein compressing data in the exchange computer system utilizing the position data and the constraint data comprises:
    determining one or more candidate trades for the plurality of exchange participants utilizing the position data and the constraint data;
    transmitting trade data indicative of the one or more candidate trades to the one or more user devices of the plurality of exchange participants;
    transmitting a request for approval to each of the plurality of exchange participants;
    receiving a response from each of the one or more user devices of the plurality of exchange participants indicating approval; and
    executing the one or more candidate trades.

3. The method for compressing data in an exchange computer system of claim 1, wherein compressing data in the exchange computer system utilizing the position data and the constraint data comprises:
    determining a first set of one or more candidate trades for the plurality of exchange participants utilizing the position data and the constraint data;
    transmitting trade data indicative of the first set of one or more candidate trades to the plurality of exchange participants;
    transmitting a first request for approval to each of the plurality of exchange participants;
    receiving a first set of responses from the plurality of exchange participants, wherein at least one response included in the first set of responses indicates rejection of at least one trade included in the first set of one or more candidate trades;
    determining a second set of one or more candidate trades for the plurality of exchange participants utilizing the position data and the constraint data;
    transmitting trade data indicative of the second set of one or more candidate trades to the plurality of exchange participants;
    transmitting a second request for approval to each of the plurality of exchange participants;
    receiving a second set of responses from the plurality of exchange participants indicating approval of the second set of one or more candidate trades; and
    executing the second set of one or more candidate trades.

4. The method for compressing data in an exchange computer system of claim 1, wherein the exchange computer system is a distributed computer system comprising an order routing system, an order matching system, and a compression engine.

5. The method for compressing data in an exchange computer system of claim 4, wherein the compression engine is a component of the order matching system.

6. The method for compressing data in an exchange computer system of claim 1, wherein the position data indicates a quantity of the financial instrument held by the exchange participant.

7. The method for compressing data in an exchange computer system of claim 6, wherein the position data is derived from an input portfolio for the exchange participant.

8. The method for compressing data in an exchange computer system of claim 7, wherein the constraint data indicates minimum and maximum bounds on metrics in a potential compressed portfolio for the exchange participant relative to values of the metrics in an input portfolio for the exchange participant.

9. The method for compressing data in an exchange computer system of claim 8, wherein the constraint data indicates a contribution of each of a plurality of financial instruments held by the exchange participant to each of the metrics in the potential compressed portfolio.

10. The method for compressing data in an exchange computer system of claim 1, wherein compressing data in the exchange computer system utilizing the position data and the constraint data comprises:
optimizing a function, wherein the function comprises, for each of the plurality of exchange participants, a sum of current credit exposures and potential future credit exposures.

11. The method for compressing data in an exchange computer system of claim 10, wherein the sum of current credit exposures and potential future credit exposures is expressed according to a base currency, and wherein the function is minimized utilizing the constraint data.

12. The method for compressing data in an exchange computer system of claim 1, wherein the position held with respect to the financial instrument by the exchange participant is expressed according to a base currency, and wherein the one or more constraints on compression defined by the exchange participant are expressed according to the base currency.

13. The method of claim 1, wherein compressing data in the exchange computer system includes reducing a number of orders and maintaining an economic exposure for each of the plurality of exchange participants.

14. A non-transitory computer-readable storage medium comprising instructions, which, when executed by one or more computer processors in an exchange computer system, cause the one or more computer processors to perform operations comprising:
receiving, via one or more user devices, position data indicative of a position held with respect to a financial instrument by an exchange participant from among a plurality of exchange participants, the position data, including a first allocation of position sizes and being received through the exchange computer system that comprises a compression engine and storage;
receiving constraint data indicative of one or more constraints on compression associated with each exchange participant, the constraint data including minimum and maximum bounds of a metric relative to values specified by the position data, or (2) data indicative of a contribution of each of a plurality of financial instruments held by the exchange participant to each of the metrics; and
compressing, by the compression engine, data in the exchange computer system utilizing the position data and the constraint data for each exchange participant, wherein compressing comprises:
applying, by the compression engine, one or more constraints specified in the constraint data to determine a new allocation of position sizes that are acceptable to the plurality of exchange participants;
determining a first set of one or more candidate trades for exchange participants, the first set of one or more candidate trades utilizing the position data and the constraint data, and wherein the first set of one or more candidate trades includes data indicative of a buy side and a sell side;
transmitting a request for approval of the first set of the one or more candidate trades to the one or more user devices of the plurality of exchange participants; and
receiving a response from the one or more user devices of the plurality of exchange participants indicating approval or rejection of the first set of the one or more candidate trades; and
generating, in response to compressing the data by the compression engine, and for each of the plurality of exchange participants, a second allocation of position sizes relative to the first allocation of positions sizes held before compression of the position data and constraint data;
cancelling, by the compression engine, in response to generating the second allocation of position sizes, a set of long positions held by each of the plurality of exchange participants with respect to the financial instrument by a set of short positions held by each of the plurality of exchange participants with respect to the financial instrument; and
upon completion of the first set of one or more candidate trades, transmitting the data indicative of the buy side and the sell side of the first set of one or more candidate trades to a third party external to the exchange computer system.

15. The non-transitory computer-readable storage medium of claim 14, wherein the instructions cause the one or more computer processors to perform operations comprising:
determining one or more candidate trades for the plurality of exchange participants utilizing the position data and the constraint data;
transmitting trade data indicative of the one or more candidate trades to the one or more user devices of the plurality of exchange participants;
transmitting a request for approval to each of the plurality of exchange participants;
receiving a response from the one or more user devices of each of the plurality of exchange participants indicating approval; and
executing the one or more candidate trades.

16. The non-transitory computer-readable storage medium of claim 14, wherein the instructions cause the one or more computer processors to perform operations comprising:
determining a first set of one or more candidate trades for the plurality of exchange participants utilizing the position data and the constraint data;

transmitting trade data indicative of the first set of one or more candidate trades to the plurality of exchange participants;

transmitting a first request for approval to each of the plurality of exchange participants;

receiving a first set of responses from the plurality of exchange participants, wherein at least one response included in the first set of responses indicates rejection of at least one trade included in the first set of one or more candidate trades;

determining a second set of one or more candidate trades for the plurality of exchange participants utilizing the position data and the constraint data;

transmitting trade data indicative of the second set of one or more candidate trades to the plurality of exchange participants; and transmitting a second request for approval to each of the plurality of exchange participants;

receiving a second set of responses from the plurality of exchange participants indicating approval of the second set of one or more candidate trades; and executing the second set of one or more candidate trades.

17. An exchange computer system comprising:

one or more processors and one or more storage devices storing instructions that are operable, when executed by the one or more processors, to cause the one or more processors to perform operations comprising:

receiving, via one or more user devices, position data indicative of a position held with respect to a financial instrument by an exchange participant from among a plurality of exchange participants, the position data, including a first allocation of position sizes and being received through the exchange computer system that comprises a compression engine and storage;

receiving constraint data indicative of one or more constraints on compression associated with each exchange participant, the constraint data including minimum and maximum bounds of a metric relative to values specified by the position data, or (2) data indicative of a contribution of each of a plurality of financial instruments held by the exchange participant to each of the metrics; and compressing, by the compression engine, data in the exchange computer system utilizing the position data and the constraint data for each exchange participant, wherein compressing comprises:

applying, by the compression engine, one or more constraints specified in the constraint data to determine a new allocation of position sizes that are acceptable to the plurality of exchange participants;

determining a first set of one or more candidate trades for exchange participants, the first set of one or more candidate trades utilizing the position data and the constraint data, and wherein the first set of one or more candidate trades includes data indicative of a buy side and a sell side;

transmitting a request for approval of the first set of the one or more candidate trades to the one or more user devices of the plurality of exchange participants; and receiving a response from the one or more user devices of the plurality of exchange participants indicating approval or rejection of the first set of the one or more candidate trades; and generating, in response to compressing the data by the compression engine, and for each of the plurality of exchange participants, a second allocation of position sizes relative to the first allocation of positions sizes held before compression of the position data and constraint data; and cancelling, by the compression engine, in response to generating the second allocation of position sizes, a set of long positions held by each of the plurality of exchange participants with respect to the financial instrument by a set of short positions held by each of the plurality of exchange participants with respect to the financial instrument; and upon completion of the first set of one or more candidate trades, transmitting the data indicative of the buy side and the sell side of the first set of one or more candidate trades to a third party external to the exchange computer system.

18. The exchange computer system of claim 17, wherein the instructions are operable, when executed by the one or more processors, to cause the one or more processors to perform operations comprising:

determining a first set of one or more candidate trades for the plurality of exchange participants utilizing the position data and the constraint data;

transmitting trade data indicative of the first set of one or more candidate trades to the one or more user devices of the plurality of exchange participants;

transmitting a first request for approval to each of the plurality of exchange participants;

receiving a first set of responses from the one or more user devices of the plurality of exchange participants, wherein at least one response included in the first set of responses indicates rejection of at least one trade included in the first set of one or more candidate trades;

determining a second set of one or more candidate trades for the plurality of exchange participants utilizing the position data and the constraint data;

transmitting trade data indicative of the second set of one or more candidate trades to the plurality of exchange participants; and transmitting a second request for approval to each of the plurality of exchange participants;

receiving a second set of responses from the plurality of exchange participants indicating approval of the second set of one or more candidate trades; and executing the second set of one or more candidate trades.

19. The exchange computer system of claim 17, wherein the exchange computer system is a distributed computer system comprising an order routing system, an order matching system, and a compression engine.

20. The exchange computer system of claim 19, wherein the compression engine is a component of the order matching system.

* * * * *

UNITED STATES PATENT AND TRADEMARK OFFICE
CERTIFICATE OF CORRECTION

PATENT NO. : 11,847,697 B1
APPLICATION NO. : 17/201702
DATED : December 19, 2023
INVENTOR(S) : Joseph Green It is certified that error appears in the above-identified patent and that said Letters Patent is hereby corrected as shown below:

In the Claims

Column 10, Line 4, Claim 1, before "sizes" delete "positions" and insert -- position --

Column 11, Line 67, Claim 14, before "data" delete "(2)"

Column 12, Line 29, Claim 14, before "sizes" delete "positions" and insert -- position --

Column 13, Line 39, Claim 17, before "data" delete "(2)"

Column 14, Line 8, Claim 17, before "sizes" delete "positions" and insert -- position --

Signed and Sealed this
Nineteenth Day of March, 2024

Katherine Kelly Vidal
*Director of the United States Patent and Trademark Office*